United States Patent
Varekamp et al.

(10) Patent No.: US 12,517,572 B2
(45) Date of Patent: Jan. 6, 2026

(54) METHOD AND APPARATUS FOR INITIATING AN ACTION

(71) Applicant: KONINKLIJKE PHILIPS N.V., Eindhoven (NL)

(72) Inventors: Christiaan Varekamp, Veldhoven (NL); Arnoldus Werner Johannes Oomen, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 67 days.

(21) Appl. No.: 18/698,073

(22) PCT Filed: Sep. 8, 2022

(86) PCT No.: PCT/EP2022/074999
§ 371 (c)(1),
(2) Date: Apr. 3, 2024

(87) PCT Pub. No.: WO2023/057166
PCT Pub. Date: Apr. 13, 2023

(65) Prior Publication Data
US 2024/0402794 A1 Dec. 5, 2024

(30) Foreign Application Priority Data

Oct. 7, 2021 (EP) .................................. 21201493

(51) Int. Cl.
*G06F 3/01* (2006.01)
(52) U.S. Cl.
CPC ................................. *G06F 3/011* (2013.01)

(58) Field of Classification Search
CPC ........... G06F 3/011; G06F 3/012; G06F 3/013
See application file for complete search history.

(56) References Cited

U.S. PATENT DOCUMENTS

| 11,042,028 B1 | 6/2021 | Welch et al. |
| 2011/0221656 A1 | 9/2011 | Haddick et al. |

(Continued)

FOREIGN PATENT DOCUMENTS

| WO | 2016191051 A1 | 12/2016 |
| WO | 2023099359 A1 | 6/2023 |

OTHER PUBLICATIONS

International Search Report and Written Opinion from PCT/EP2022/074999 mailed Dec. 12, 2022.

*Primary Examiner* — Antonio Xavier

(57) ABSTRACT

An apparatus comprises a first sensor (101) and second sensor (103) arranged to determine a first and second set of properties for entities being devices or persons, the sets being determined in accordance with different sensor modalities. A first processor (105) determines directions between entities and a second processor (107) determines an orientation of an entity. A first detector (109) detects a bi-directional information exchange link between a first person and another entity out of a plurality of possible bi-directional information exchange links between entities in response to the directions and the at least one orientation. An initiator (111) initiates an action in response to the detection of the bi-directional information exchange link. The detection of the bi-directional information exchange link is in response to the first set of properties and the second set of properties.

29 Claims, 3 Drawing Sheets

(56) References Cited

U.S. PATENT DOCUMENTS

| | | | |
|---|---|---|---|
| 2012/0249416 A1* | 10/2012 | Maciocci | H04N 9/3173 345/156 |
| 2013/0222590 A1* | 8/2013 | O'Brien | G05D 1/0038 348/148 |
| 2013/0331034 A1* | 12/2013 | Tucker | H04M 1/6066 455/41.2 |
| 2014/0002492 A1* | 1/2014 | Lamb | G06F 3/0304 345/633 |
| 2016/0261666 A1 | 9/2016 | Hinkley et al. | |
| 2019/0130599 A1 | 5/2019 | Gebbie et al. | |

* cited by examiner

METHOD AND APPARATUS FOR INITIATING AN ACTION

CROSS-REFERENCE TO PRIOR APPLICATIONS

This application is the U.S. National Phase application under 35 U.S.C. § 371 of International Application No. PCT/EP2022/074999, filed on Sep. 8, 2022, which claims the benefit of EP Patent Application No. EP 21201493.0, filed on Oct. 7, 2021. These applications are hereby incorporated by reference herein.

FIELD OF THE INVENTION

The invention relates to an apparatus and method for initiating an action based on detection of links between entities, and in particular, but not exclusively, to initiating an action based on man-machine interactions.

BACKGROUND OF THE INVENTION

Human-machine interactions are becoming increasingly prevalent, and many new applications based on or utilizing interactions between humans and machines are being developed. For human to machine interactions voice control is getting increasingly important and popular as it may provide a more efficient and user friendly interaction in many practical situations. It may often, e.g. in critical environments such as hospital environments, provide contactless operation and a simpler user interface (less physical buttons).

As an example, an increasing number of devices that interact with humans are becoming part of home or professional environments. Indeed, homes and offices increasingly comprise a number virtual or voice assistants that can be interfaced with by users using voice commands and queries. Examples include home assistant devices such as Amazon Alexa, Apple Siri, Microsoft Cortana and Google Assistant that have become widespread in many homes and offices. In addition, voice assistants or direct human interfaces may be implemented in appliances and other devices, such as televisions, radios, etc. Such devices may often be operated and accessed by different people at different times and may often be used in environments where multiple people are present at the same time, such as home and office spaces.

Another example is in the health industry where a large number of devices may often be present in the same room. For example, in an operation theatre, a large number of devices may be present and used to monitor the health and biological condition of the patient and for providing information to the health professional, such as specifically the surgeon, specialists, nurses, etc. Further, a relatively large number of people may dynamically be interacting with the devices with the interactions between people and devices often changing fast and quite substantially.

It is therefore of increasing importance in many scenarios that human machine interaction is efficient, robust, and practical when used in dynamic environments in which multiple people and multiple devices may be present. However, most current systems tend to be focused on a direct link between one person and a single device where the device itself interacts directly with a single person to detect command and requests. However, whereas such an approach may be efficient in many scenarios and applications, it may also have a number of disadvantages and may not be optimal in environments with multiple devices and people.

An improved approach would be advantageous in many scenarios. In particular, an approach that allows improved operation, increased flexibility, reduced complexity, facilitated implementation, an improved user experience, a more reliable, more robust interaction or operation, reduced computational burden, wider applicability, facilitated operation, and/or improved performance and/or operation would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided an apparatus comprising: a first sensor arranged to determine a first set of properties for a plurality of entities in a real-world environment, the first set of properties being determined in accordance with a first sensor modality, each entity of the plurality of entities being a person or a device; a second sensor arranged to determine a second set of properties for the plurality of entities, the second set of properties being determined in accordance with a second sensor modality, the second sensor modality being different from the first sensor modality; a first processor arranged to determine real-world directions between entities of the plurality of entities; a real-world direction between two entities being a direction from one entity of the two entities to another entity of the two entities in the real-world environment; a second processor arranged to determine at least one real-world orientation of an entity of the plurality of entities in response to the first set of properties; a first detector arranged to detect a real-world bi-directional information exchange link existing between a first person of the plurality of entities and another entity of the plurality of entities out of a plurality of possible real-world bi-directional information exchange links between entities of the plurality of entities in response to the real-world directions and the at least one real-world orientation, the real-world bi-directional information exchange link being a real world audiovisual communication link enabling information to be exchanged from the first person to the another entity and information to be exchanged from the another entity to the first person; an initiator arranged to initiate an action in response to the detection of the real-world bi-directional information exchange link, and wherein first detector is arranged to detect the real-world bi-directional information exchange link in response to the first set of properties and the second set of properties.

The invention may provide an improved user experience and/or enhanced functionality and/or performance in many applications and scenarios. It may for example in many embodiments provide improved man-machine interfacing. In particular, it may typically allow improved operation/performance/user experience in environments with multiple people and/or devices interacting with each other. The approach may for example allow actions to be initiated to reflect the communication interactions between people and/or between people and devices.

In many embodiments, a more robust and/or reliable and/or flexible user interaction may be achieved, such as for example by providing improved user control based on e.g. voice control or gesture control. The apparatus may in many scenarios act as an "intermediate" or "middleman" that detects interactions between two entities and adapts operation of a system/device, or indeed of one of the entities for which the bi-directional information exchange link may be detected, depending on the detection. Effects similar to those sometimes subconsciously adopted by humans in complex and non-homogeneous environments may be achieved.

In some embodiments, the second processor is arranged to determine the at least one orientation of the entity of the plurality of entities in response to both the first set of properties and the second set of properties.

In some embodiments, the second processor is arranged to determine the at least one orientation of the entity of the plurality of entities in response to the first set of properties and the first processor is arranged to determine directions between entities of the plurality of entities in response to the second set of properties.

In some embodiments, the first processor is arranged to determine the directions in response to the first set of properties. In some embodiments, the first processor is arranged to determine the directions in response to the second set of properties. In some embodiments, the first processor is arranged to determine the directions in response to both the first set of properties and the second set of properties.

The combined set of directions and at least one orientation may be generated by the first processor and the second processor in dependence on both the first set of properties and the second set of properties. The combined set of directions and at least one orientation may be generated by the first processor and the second processor in dependence on both the first and second sensor modality data.

The first set of properties and/or the second set of properties may comprise at least one property selected from the group of: a power status of a device; a position of an entity; an orientation of an entity; a head orientation for a person; an eye pose for a person; a glance direction for a person; a gesture of a person; a direction of movement of an entity; a user action; a sound emitted from an entity; and speech from a person.

The initiator may be arranged to initiate the action by generating an initiate action command or message, and forwarding/transmitting this to a processor.

The real-world audiovisual communication link may be a communication link supporting communication of information/data using at least one of sound and light.

In accordance with an optional feature of the invention, the at least one real-world orientation comprises a real-world orientation of the first person.

This may provide improved performance in many scenarios and may in particular provide improved detection of bi-directional information exchange link in many scenarios, applications, and embodiments. It may allow efficient operation and often enhanced functionality.

In accordance with an optional feature of the invention, the first detector is arranged to determine the real-world bi-directional information exchange link in response to a real-world direction between the first person and the another entity.

This may provide improved performance in many scenarios and may in particular provide improved detection of bi-directional information exchange link in many scenarios, applications, and embodiments. It may allow efficient operation and often enhanced functionality.

In accordance with an optional feature of the invention, the first detector is arranged to determine the real-world bi-directional information exchange link in response to a detection that a real-world orientation of the first person aligns with a real-world direction between the first person and the another entity.

This may provide particularly advantageous operation in many embodiments. It may in many scenarios allow efficient detection of a bi-directional information exchange link that are particularly suited for adapting operation and initiating actions of particularly suitability for providing an enhanced user experience, including in particular for the first person.

The first detector may be arranged to evaluate an alignment criterion by comparing a direction vector reflecting the orientation and a direction vector reflecting the direction between the first person and the another entity. An alignment may for example be considered to exist if the directions are sufficiently parallel, such as e.g. with a minimum angle not exceeding a given threshold or a normalized dot product of the vectors not being below a given threshold.

In accordance with an optional feature of the invention, the at least one real-world orientation comprises an orientation of the another entity.

This may provide particularly advantageous operation in many embodiments and may in particular allow improved detection of a suitable bi-directional information exchange link for initiating an action.

In accordance with an optional feature of the invention, the first detector is arranged to determine the real-world bi-directional information exchange link in response to a criterion that includes a requirement that an orientation of radiation of information from the another entity to the first person is aligned with a direction between the first person and the another entity.

This may provide particularly advantageous operation in many embodiments and may in particular allow improved detection of a suitable bi-directional information exchange link for initiating an action. The projection direction may specifically be a main or central direction for projecting information from the another entity. It may specifically be a direction orthogonal to a display plane or a central axis for speaker or speaker arrangement.

In accordance with an optional feature of the invention, the first detector is arranged to determine the real-world bi-directional information exchange link in response to a criterion that includes a requirement that a view direction of the first person is aligned with a direction between the first person and the another entity.

This may provide particularly advantageous operation in many embodiments and may in particular allow improved detection of a suitable bi-directional information exchange link for initiating an action.

In accordance with an optional feature of the invention, the apparatus further comprises a second detector for detecting a trigger action by the first person; and wherein the initiator is arranged to initiate the action in response to the trigger action.

This may allow improved operation, performance, and/or user experience in many embodiments.

In accordance with an optional feature of the invention, the second detector is arranged to detect the trigger action as a communication by the first person over the real-world bi-directional information exchange link.

This may allow improved operation, performance, and/or user experience in many embodiments.

In accordance with an optional feature of the invention, the first sensor modality is a vision modality and the second sensor modality is an audition modality.

This may allow improved operation, performance, and/or user experience in many embodiments.

In accordance with an optional feature of the invention, the another entity is a person.

This may allow improved operation, performance, and/or user experience in many embodiments. In particular, it may allow adaptation of a system, and e.g. specifically a man-machine interface, to be adapted based on detection of interpersonal bi-directional information exchange links.

In accordance with an optional feature of the invention, the first detector is arranged to detect the real-world bi-directional information exchange link in response to a detection that a real-world pose for the first person and a real-world pose for the another entity meet a match criterion; and a sound from at least one of the first person and the another entity meet a criterion.

This may provide improved performance in many scenarios and may in particular provide improved detection of bi-directional information exchange link in many scenarios, applications, and embodiments. It may allow efficient operation and often enhanced functionality.

In accordance with an optional feature of the invention, the action is an action of the another entity.

In accordance with an optional feature of the invention, the first sensor modality and the second sensor modality are different modalities selected from the group of: Vision, Audition, Tactition, Ultrasound, Infrared, Radar, and Tag detection.

In some embodiments, the another entity is a device.

This may allow improved operation, performance, and/or user experience in many embodiments.

In some embodiments, the bi-directional information exchange link comprises an audiovisual communication link from the first person to the another entity.

This may allow improved operation, performance, and/or user experience in many embodiments.

In some embodiments, the bi-directional information exchange link comprises an audiovisual communication link from the another entity to the first person.

This may allow improved operation, performance, and/or user experience in many embodiments.

In some embodiments, the first sensor comprises a plurality of sensor elements at different positions in the environment.

This may allow improved operation, performance, and/or user experience in many embodiments.

In some embodiments, the apparatus further comprises a user output for generating a user indication in response to the detection of the bi-directional information exchange link.

This may allow improved operation, performance, and/or user experience in many embodiments. It may allow an improved adaptation that further may provide feedback to users allowing a combined user/device adaptation to occur.

In some embodiments, the initiator is arranged to determine an identity indication for the first person and wherein the initiation of the action is dependent on the identity indication.

This may allow improved operation, performance, and/or user experience in many embodiments. It may allow improved user adaptation and optimization for the individual user.

According to an aspect of the invention there is provided a method of initiating an action, the method comprising: determining a first set of properties for a plurality of entities in a real-world environment, the first set of properties being determined in accordance with a first sensor modality, each entity of the plurality of entities being a person or a device; determining a second set of properties for the plurality of entities, the second set of properties being determined in accordance with a second sensor modality, the second sensor modality being different from the first sensor modality; determining real-world directions between entities of the plurality of entities; a real-world direction between two entities being a direction from one entity of the two entities to another entity of the two entities in the real-world environment; determining at least one real-world orientation of an entity of the plurality of entities in response to the first set of properties; detecting a real-world bi-directional information exchange link between a first person of the plurality of entities and another entity of the plurality of entities out of a plurality of possible real-world bi-directional information exchange links between entities of the plurality of entities in response to the real-world directions and the at least one real-world orientation, the real-world bi-directional information exchange link being a real world audiovisual communication link enabling information to be exchanged from the first person to the another entity and information to be exchanged from the another entity to the first person; initiating an action in response to the detection of the real-world bi-directional information exchange link, wherein the detection of the real-world bi-directional information exchange link is in response to the first set of properties and the second set of properties.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

Figure 1:
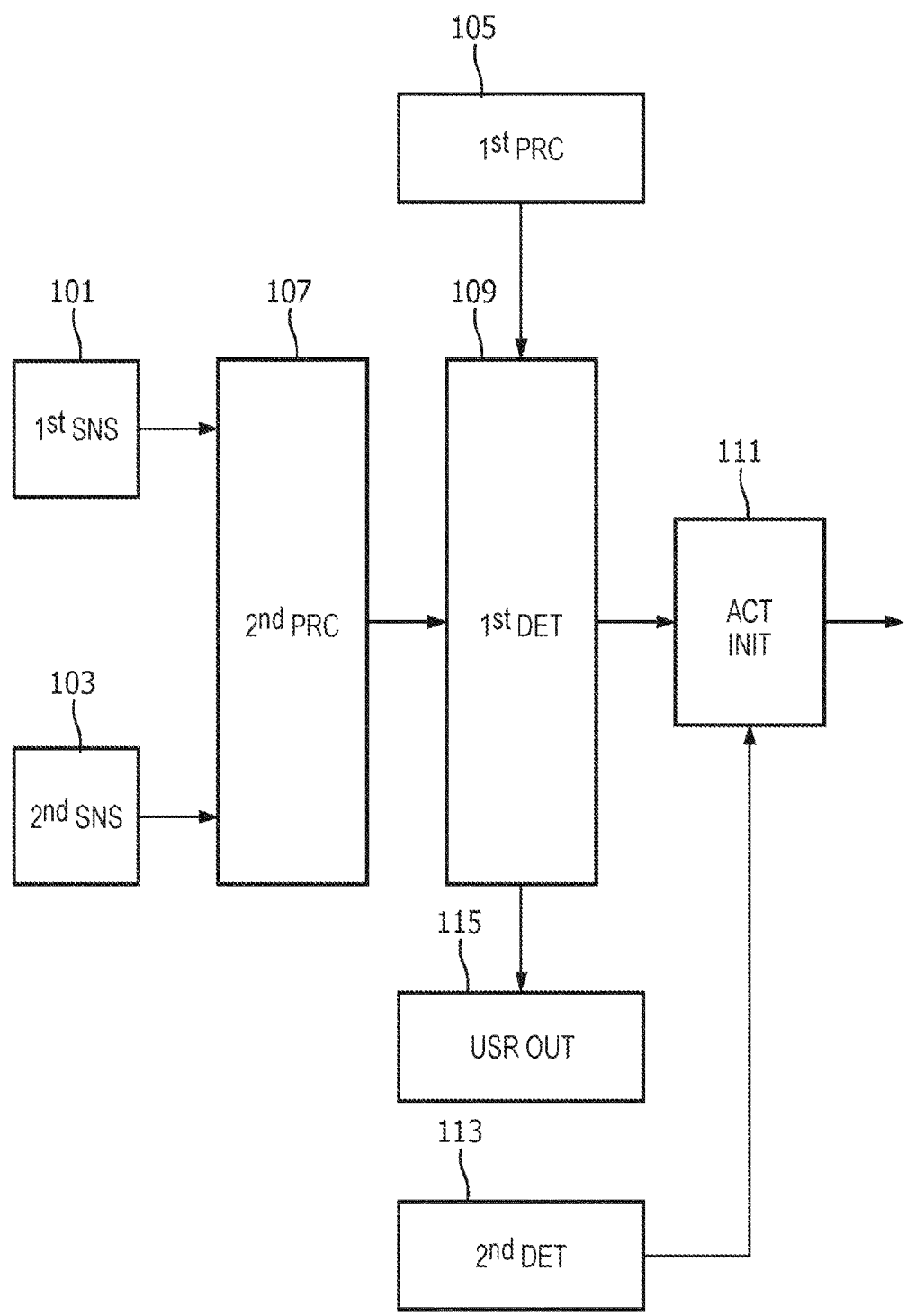
FIG. 1 illustrates an example of components of an apparatus in accordance with some embodiments of the invention.

The presence of devices interacting with humans are becoming an increasingly common part of everyday life and the amount of human to machine interactions is rapidly increasing and is starting to become ubiquitous.

As an example, a home, or even a room of a house, or an office may comprise a relatively large number of devices that can be controlled by humans e.g. by audio actions (e.g. spoken commands) or visible actions (e.g. gestures) etc. Multiple people may be present in the room and may seek to interact with the different devices, such as e.g. voice assistants, displays, audio reproduction systems, etc.

As another example, in medical environments such as in an ambulance, hospital ward, or operating theatre, a plurality of health professionals may seek to interact with a range of devices via e.g. voice or gesture commands.

However, man machine communication in environments comprising many entities, where each entity may be a person or a device, tend to be very difficult to manage and it tends to be very difficult in such environments to ensure that the correct (device) actions are initiated based on appropriate properties of user actions.

In the following, an approach will be described which in many embodiments and scenarios may assist in initiations of actions in real-world environments (in the following the term environment will for brevity be used to refer to the real-world environment) with multiple entities, and specifically with multiple persons and devices being present in the same environment, such as in the same room. The approach is based on an apparatus being arranged to detect bi-directional information exchange links in the real-world between at least a first person and another entity in the real-world environment, and specifically to another person and/or another device in the environment. The real-world bi-directional information exchange link may be a link where information is exchanged from the first person to the other entity and information is exchanged from the entity to the first person. The real-world bi-directional information exchange link enabling the first person to receive information from the first entity and to provide information to the another entity. The link may be a real-world communication link allowing data and information to be exchanged in both directions between the first person and the other device/person. For example, a bi-directional information exchange link may exist between a person and a display where the person can control the display by voice commands and the display can provide images that can be seen by the user. Based on the detection of a link between the first person and the other entity, an action may be initiated.

The link may be a visual link. For example, a bi-directional information exchange link may exist between a person and a display, where the person can control the portion of an image that is zoomed-in by the focus of his eye.

The link may be a gesture link. For example, a bi-directional information exchange link may exist between a person and a robot arm device, where the person can control the robot arm by hand gestures.

FIG. 1 illustrates an example of an apparatus that may initiate an action based on properties detected in the environment. The environment is a real-world environment and properties of real-world entities and real-world interactions are determined. Similarly, directions and orientations of persons and entities are determined in the real-world and are real-world directions and/or real-world orientations, such as directions and orientations in the real-world. The following references to such properties may accordingly be considered to refer to real-world properties (rather than virtual properties).

The apparatus comprises a first and second sensor 101, 103 which are arranged to sense a real-world environment. The two sensors 101, 103 use different modalities, for example the first sensor 101 may be a camera capturing visual information of the environment and the second sensor 103 may be a microphone array capturing audio information of the environment. The sensors may determine properties of the environment based on the captures of the environment. For example, the first sensor 101 may detect features in the captured images corresponding to possible entities in the environment, such as image objects corresponding to faces, humans, displays, etc. The second sensor may for example determine different audio sources in the environment, and e.g. may determine direction of arrivals, volume, type of audio (e.g. speech, music, . . . ) for different audio sources.

The apparatus further comprises a first processor 105 which is arranged to determine real-world directions between entities of a plurality of entities in the real-world environment where each entity may be a person or a device. The direction from a first entity to a second entity (and thus equivalently the direction from the second entity to the first entity) is determined and may e.g. be represented as a vector. In many embodiments, the first processor may determine positions of different entities, such as the positions of people and devices, in the environment and from the positions determine the directions. The first processor 105 may determine positions and directions based on the sensor input or may e.g. determine directions and/or positions based on e.g. a direct user input for one or more entities. For example, a user may enter positions for static devices, such as displays or medical monitoring equipment, and the first processor 105 may estimate positions of people in the environment based on the video capture and audio captures. As another example, devices may communicate their position, e.g. through GPS or based on fixture to a known grid such as a mounting rack. It may then determine the directions between all entities from the determined positions.

The first and second sensors 101, 103 are further coupled to a second processor 107 which is arranged to determine the at least one orientation of an entity based on the properties determined by at least one of the first and second sensors 101, 103.

The second processor 107 may typically be arranged to determine/estimate the real-world orientation of at least one person in the real-world environment. The orientation may be determined to reflect the direction in which the person is facing, a head orientation, a gaze direction, eye tracking direction etc. The orientation for a person may accordingly be indicative of the direction of focus for the person.

In many embodiments, the second processor 107 may determine orientations for a plurality of entities in response to the sensor data. For example, it may be arranged to detect devices in the environment and determine the direction in which they are facing. For example, the facing direction of a display may be estimated based on the video captured by a first sensor 101.

The first processor 105 and second processor 107 are arranged to dynamically update directions and/or the orientation(s) to reflect changes for at least one of the entities. Specifically, as a person moves or turns in the environment, the first processor 105 and second processor 107 may update the directions to entities and/or the orientation(s) to reflect the person's movements.

The first processor 105 and the second processor 107 are coupled to a first detector 109 which is arranged to evaluate the determined directions and orientation(s) to detect a bi-directional information exchange link in the real-world environment between a (first) person and another entity which will henceforth also be referred to as the target entity. The target entity may be another person or may be a device, such as a display or medical instrument or apparatus (e.g. an electrocardiograph machine, dialyser, etc.)

A real-world bi-directional information exchange link may be considered as a real-world link between two real-world entities, which is ready for bi-directional information exchange. The actual information may be either unidirectional (e.g. only a command without a response from the receiving entity) or bi-directional (e.g. a command followed by a response from the receiving entity, e.g. display of an image). It is also possible that after establishment of the bi-directional information exchange link, there is no information exchanged, for example the doctor just checking the current status of a display.

The real-world bi-directional information exchange link is formed in the real-world and is an information exchange/transmission link existing in/through real-world space. It may be a communication link that exists through the air of the environment. Specifically, the real-world bi-directional information exchange link may be a link formed/supported by light and/or sound transmission between (to/from) the person and the entity. The real-world bi-directional information exchange link may include one or more optical/light based communication/information links and/or one or more audio/sound based communication/information links.

The detector is coupled to an initiator 111 which is arranged to initiate an action in response to the detection of the bi-directional information exchange link. The initiator 109 may specifically be arranged to generate an action initiation command and transmit this to a receiver, which specifically may be another device or entity. The action initiation command may comprise a command to initiate an action. The action initiation may for example be a process initiation, software program/routine initiation, etc. In many embodiments, the initiator 111 may be arranged to initiate the action by transmitting an action initiation command to a remote device. The action may specifically be an action of a (device) entity of the plurality of entities (for which directions and/or orientation has been determined). The initiator 111 may be arranged to initiate an action of a device of the entities by transmitting an action initiation command/message to the device.

In some embodiments, the initiator 111 may be arranged to initiate the action when it is detected that a bi-directional information exchange link exists. The detection of the bi-directional information exchange link may trigger the initiation of the action. For example, when it is detected that a bi-directional information exchange link exists between a given first person and one of the devices, the initiator 111 may generate and transmit an action initiation command to the device with which the bi-directional information exchange link is formed (for example, triggered by eye contact with a device).

In other embodiments, the action may be initiated when a trigger is detected. The apparatus may in such embodiments comprise a second detector 113 which is arranged to detect a trigger action by the first person. The trigger action may typically be determined based on the data/properties generated by the sensors. The trigger action may specifically be detected by detecting a specific sound or movement of the first person using the output from an audio sensor or video sensor.

The second detector 113 is coupled to the initiator 111 which is fed an indication of the trigger action being detected. In response to detecting the trigger action, the initiator 111 may proceed to initiate the action, such as e.g. by transmitting an action trigger command to the appropriate external device.

An example of a trigger action may in some embodiments be an audible cue such as a 'wake-word' trigger. For example, it may be detected that a bi-directional information exchange link exists where a person is looking at a given medical instrument in an operating theatre, with the medical instrument providing e.g. information on the health status to the person (such as e.g. a doctor). However, despite the bi-directional information exchange link being detected, the apparatus may not perform any action. If the person/doctor at some point issues a suitable audible command (e.g. "start test"), the second detector 113 may detect this cue and the initiator 111 may proceed to transmit an action initiation command to the medical instrument thereby causing the medical instrument to perform a diagnostic test procedure. The apparatus may determine which device to transmit the action initiation command to depending on the detected bi-directional information exchange link. For example, when the term "start test" is detected, the apparatus may, based on the detected bi-directional information exchange link, determine which of the plurality of possible devices should initiate the test, i.e. it may determine which other device the skilled person is seeking to command.

In some embodiments, the destination of the action initiation command may depend on the bi-directional information exchange link, such as specifically by the destination being a device forming the bi-directional information exchange link.

In some embodiments, the action being initiated, and/or a property thereof, may depend on the bi-directional information exchange link. For example, the command that is transmitted may depend on which device the bi-directional information exchange link is formed with, and thus the command may be adapted to the destination device. For example, when detecting the audible cue of the term "start test" being uttered by the first person, the apparatus may evaluate which device the bi-directional information exchange link is formed with and then generate the action imitation command that is specifically suited for this device. Thus, different commands may be transmitted to different devices without the user needing to be concerned with explicitly defining the intended recipient of the command.

In some embodiments, the action being initiated, and/or a property thereof, may depend on the trigger action. For example, the second detector 113 may be arranged to detect different trigger terms and depending on which trigger is detected, different action initiation commands may be generated and transmitted. For example, depending on whether the user utters the terms "start test one", "start test two", "start test three", etc., the initiator 111 may generate different action initiation command that respectively may instruct the medical instrument to perform different diagnostic tests.

It will be appreciated that different trigger actions may be used in different embodiments and that these may be detected based on different modalities (and specifically may be detected based on data from the first sensor 101, the second sensor 103, or both. For example, in some embodiments, gestures or movements may be detected as trigger actions based on visual capture of the environment.

Many different algorithms and approaches for detecting user input actions and commands will be known to the skilled person and these will for brevity and clarity not be described in more detail herein. However, it will be appreciated that any suitable approach for detecting a trigger action by a user/person may be used without detracting from the described principles and approach.

In many embodiments, the second detector 113 may be arranged to detect the trigger action as a communication by the first person over the bi-directional information exchange link. The trigger action may specifically be an action that is part of a communication from the first person to a device or person with which the first person is detected to have formed a bi-directional information exchange link.

For example, if the bi-directional information exchange link is detected to exist between the first person and another person by these talking to each other, the second detector 113 may monitor speech from the first person captured by a microphone array of the second sensor. If e.g. a predetermined phrase is detected in this speech, a trigger action may be considered to have been detected.

As another example, if the bi-directional information exchange link is detected to be between the first person and a display which displays information that can be read by the first person and which is arranged to e.g. detect gestures from the first person, the second detector 113 may be arranged to monitor the first person to detect any such gestures. In response to detecting a gesture, the apparatus may then initiate an action. For example, it may generate an action initiation command that is sent to a different device to cause an action to be performed/executed in this device.

In some embodiments, the apparatus may accordingly detect a bi-directional information exchange link between a person and another entity and depending on information from the first person to the other entity may initiate an action in another device. For example, in response to a person giving a gesture or audio command to a display, a different device may generate an audio indication. The apparatus may in such scenarios effectively "eavesdrop" on an information exchange between a person and a device or another person, and may take action if a specific trigger action is detected.

The apparatus may assist in providing efficient man-machine interfacing and interactions in many scenarios and environments in which a plurality of entities co-exist. For example, an environment may exist in which several people are present and trying to interact with several devices using man-machine interfaces based on e.g. audio or visual commands and instructions. For example, in an operating theatre or an intensive care unit, there may be a relatively high number of different devices used to monitor and evaluate the health of the patient (or patients). In addition, a number of devices may be present to provide various information to the health professionals, including e.g. several displays that provide different information aimed at different specialists. In addition, several health professionals may be present and interacting with these devices including surgeons, consultants/specialists, nurses etc.

In such environments, it is challenging to ensure reliable, efficient, and user friendly control of devices based on interactions between people and devices or between different people. Indeed, conventional approaches of e.g. each individual device detecting speech and/or gesture tends to be insufficient and unreliable with typically uncertainty arising about which actions and devices are intended to be activated.

The described approach may facilitate and/or enable improved operation in for example scenarios with many devices and/or people. It may for example effectively operate as a "middleman" which can detect connections/links between entities and initiate actions based on the specific links that are formed. The apparatus may specifically continuously monitor the environment and adapt operation of one or more of the devices (or indeed of another device) in response to specific links being established.

As a specific example, the apparatus may be implemented in an operating theatre with e.g. a camera capturing the entire room and one or more microphone arrays being located at different positions in the theatre. The apparatus may for example detect faces in the room and determine the orientation of the corresponding heads. In this way it may be detected that a medical professional is facing a voice controlled medical instrument with a display that itself is facing the medical professional. For example, this may be based on manually input information about the position or orientation of the display, or may be based on automatic detection of the display based on e.g. on the camera sensor data. Based on the audio sensor, it may further be detected that the medical profession is speaking while facing the display, and based on e.g. the camera sensor it may be detected that the medical instrument is on and displaying information. It may accordingly by the apparatus be detected that a bi-directional information exchange link is formed between the medical professional and the medical instrument, and in response an action may be initiated on the apparatus itself, or typically on a different device which specifically may be the medical instrument. For example, the apparatus may transmit a command to the medical instrument that indicates that the bi-directional information exchange link has been detected and that the medical instrument should respond to voice commands. As another example, a different action may be initiated such as a light being switched on which highlights an area that is associated with the medical instrument (e.g. a complex user interface).

As another example, depth sensors and skeleton detection software (e.g. Microsoft Skeletal Tracking™ as is known in the art) may for each detected person in the environment determine a head-gaze vector. For example, such a vector may be pre-calculated as a function of 3D ear, nose and eye positions using a variation of human head graphics models. Given the detected skeleton data, the apparatus may calculate this head-gaze vector. The head position and this vector for all persons may be the output of a head pose estimation stage. A multi microphone signal analysis may provide sound data as a rough function of orientation relative to the capture device. Depth cameras and microphones may in some embodiments be positioned in a single device and the device may associate sound fragments with head poses based on direction relative to the capture devices. After such a correspondence estimation step, the apparatus may detect bi-directional information exchange links by analyzing the relative position and direction of pose vectors. A simple criterion can be used to establish a bi-directional information exchange link based on both sound and image data.

As an example, the following approach may be used to detect a bi-directional information exchange link between two people:
1. input: two head pose vectors:
2. input: sound originating from each head
3. if both heads have produced sound over a given past time interval (e.g. 5 s)
4. and the two head pose vectors are sufficiently parallel in opposite directions (e.g. an angular difference of less than 30 degrees)
5. then a communication between the two persons is present As another example, an active bi-directional information exchange link between a person and a display can be detected by following the following approach:
1. input: multiple head pose vectors
2. input: sound originating from each head
3. input: position and orientation of the display
4. search for the head pose vector that lies most parallel to the display normal vector but with opposite direction
5. if the angular difference is less than a threshold (e.g. 10 degree)
6. then a communication between the person and the display is present In response to the detection of this bi-directional information exchange link, the display may e.g. show a small picture or the name of the person with which the communication is ongoing, or e.g. the display could also rotate, or a 3D view could be optimized for the direction of the person.

Another application scenario is a hybrid communication scenario where a number of people are physically co-located in the same room while another set of people are available over an audio/visual link. The apparatus may detect a bi-directional information exchange link corresponding to someone in the same space talking to someone else in that space. The apparatus may then initiate an action of transmitting information of this direct person to person bi-directional information exchange link to the people that are not present in the same space, but are in contact using communication via the audio/video link. In this way, the non co-located set of people can be informed of direct person to person communications (as well as communication links), e.g. they can be presented with graphical representations indicating who is talking to who in the other location (e.g. by changing the pose of rendered avatars). This will highly increase the immersion for the non co-located set of people. The approach may in particular allow improved performance and operation in many embodiments. The apparatus may be considered to provide similar effects and operations as may in some scenarios be achieved by humans in environments with groups of humans interacting with each other. The apparatus may in some embodiments act as a "middleman" between people/devices and provide additional information relating to the interactions/communication/information exchange between the different entities in the environment. This may allow an approved adaptation to the current scenario and e.g. allow improved man-machine interfaces in complex scenarios.

For example, major advantages of using voice controls of equipment, in particular in hospital environments, are contactless operation and a simpler user interface (less physical buttons). However, although significant steps have been made in improving the performance of voice control engines, human to machine interaction is still far from the immersive experience of human to human interaction, and in particular tends to fail to provide the same ease of interaction, adaptability, and reliability in complex scenarios. In particular, use cases where multiple people (simultaneously) interact with one or more devices are challenging. The described apparatus may assist in such examples by monitoring or surveying the environment in ways that may resemble how humans present in an environment may use multiple information to evaluate the scenario.

The approach may in some embodiments improve immersion of human to machine interaction so that the difference between interacting with a machine versus a human is reduced, i.e. specifically it may in many scenarios allow a user to interact with devices in a way that is more natural and similar to how the user would interact with another human being. For example, in many practical environments, in particular in the hospital environment, a person in the middle may be required to interpret and execute a specific command issued by e.g. the physician(s). Also, headsets or other on-body devices are possibly required for reliable interaction with devices.

Figure 2:
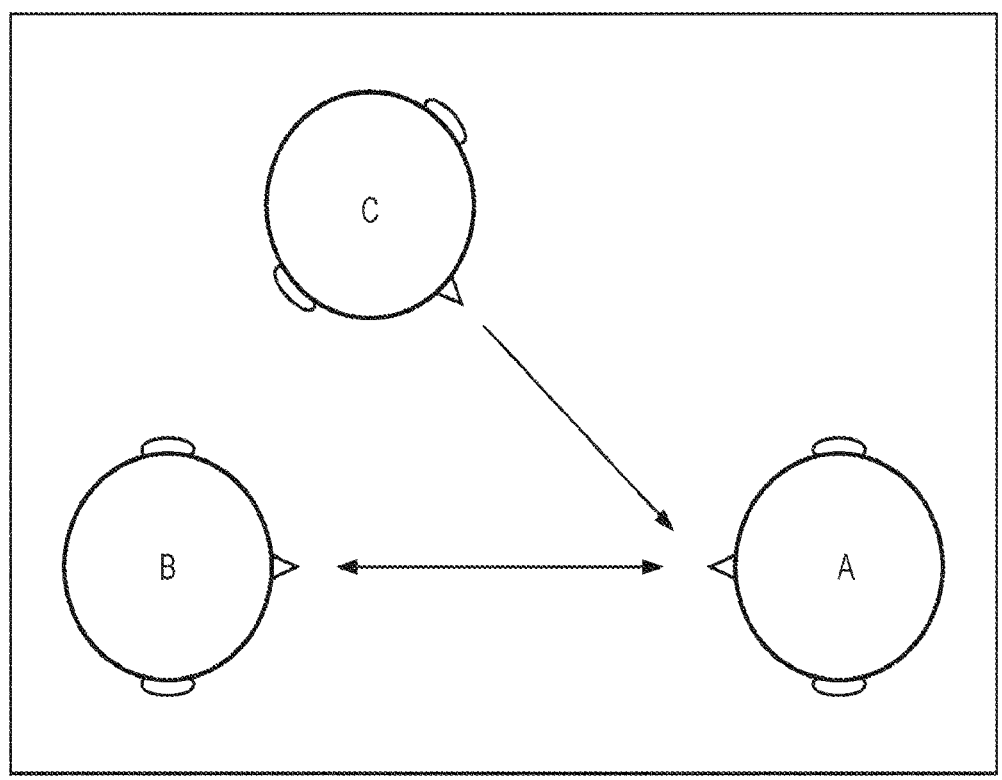
FIG. 2 illustrates an example of people interacting in an environment.

In real-life 'human to human' communication, a wide variety of visual and audible cues are subconsciously used. An exemplary scenario of human interactions is illustrated in FIG. 2. In such a scenario, an important visual cue is 'eye contact'. When a person B,C is looking at a person A, it indicates that this person B,C is ready to receive information from person A. When person A also looks at a person B, a two-way communication channel is typically established, and person A directly interacts with that person B. After a two way communication channel is established between two persons A, B, e.g. through eye contact, the other person(s) C can still receive information from person A (and person B), but person C implicitly knows that he/she should not interfere while there still is communication between person A and B.

The apparatus may sense the environment using multiple different modalities in order to observe and detect bi-directional information exchange links between people or between people and devices. This may provide operation similar to how a human 'middle man' would use his senses (eyes and ears) to determine who is talking to who. The apparatus may detect such bi-directional information exchange links in the environment and initiate an action, such as informing another device of the presence of the link, or of a characteristic thereof, such as which entities are involved. This may for example be used by devices to adapt operation, such as e.g. it may provide information to a specific device that it is indeed part of a detected bi-directional information exchange link and that it should therefore react to e.g. voice commands.

The approach may further be enhanced by the apparatus detecting a trigger which can specifically be an audible or visual cue from the first person. The trigger may be considered when generating the action and e.g. the action may not be carried out until the trigger action is detected or a property of the action may depend on the trigger action. The trigger action may be an audible cue such as a 'wake-word' trigger.

As an example, in the human scenario, person C can request person A's attention by calling his name. In typical human to human communication, whether and when person C issues an audible cue will depend on the status of the visual cues, specifically whether person A is still having eye contact with person B, or whether person A or person B are still actively communicating. The described apparatus may for example allow a similar operation to be achieved where different modalities are evaluated to detect if bi-directional information exchange links exist and possible whether a trigger action is performed to cause an action to be performed.

The specific algorithm and criterion for detecting a bi-directional information exchange link may be different in different embodiments depending on the specific desired operation and performance.

In general, the detection of the bi-directional information exchange link is based on the directions between entities and on the orientation of at least one, and often more or all, of the entities.

In many embodiments, the first processor may first determine current positions for all the devices and/or persons that are considered. This may for example be based on knowledge of sensor positions, such as positions of cameras and microphones, microphone arrays, and object detection that provides a direction from the sensor to different detected items. For example, for a camera, image object detection may be performed to detect objects corresponding to people or relevant devices (e.g. displays or other devices identified by optical characteristics, including where e.g. an optically detectable sticker is attached to the device to assist in detection and identification). Similarly, for microphone arrays, audio sources may be detected with the directions to these being detectable from the beamforming weights. Based on the estimated directions from the known sensor positions, the estimated positions of people and/or devices may be estimated.

In some embodiments, some or all of the positions may be determined in response to user inputs, such as for example by the user explicitly entering position data. In some embodiments, a dedicated position determination process may be performed. E.g. displays may present specific images that allow for facilitated detection and identification and may emit a specific sound that is easily detectable.

Based on the positions, the directions between the devices may be determined. These may for example be represented by vectors. A (real-world) direction between two entities being a direction (in the real-world environment) from one entity of the two entities to another entity of the two entities in the real-world environment. In some embodiments, the positions and/or the distance between entities may also be considered, e.g. as represented by a starting point and a length of the vectors respectively. The positions may be static and/or dynamically updated. Indeed, in many embodiments, some entities (e.g. stationary devices) may be represented by static positions whereas other entities (e.g. people) may be represented by positions that are constantly changing. Correspondingly, some directions (e.g. between static devices) may be constant while other directions between entities may be dynamically changing and dynamically updated.

In addition, the second processor 107 may determine the orientation of one or more entities in the real-world environment. For example, all orientations of humans may be determined, e.g. based on facial recognition and/or skeleton tracking. In many embodiments, orientations may be considered for devices. These may for example be estimated based on sensor inputs or may e.g. for some or all devices be automatically estimated. For example, the size and shape of a display image object in an image captured by a camera of the first sensor 101 may be evaluated to determine the orientation of the display, and thus in which direction the display is projecting the image.

The (real-world) orientations and directions may be determined with reference to a coordinate system applied to the real-world environment. Thus, coordinates/poses of the coordinate system directly match coordinates/poses in the real-world environment.

In some embodiments, the first detector 109 may detect the bi-directional information exchange link using a criterion that considers directions between e.g. the first person and a device which is not the one that is involved in the bi-directional information exchange link. For example, the first person may be looking at a specific marker (placeholder) in the room, the position of which does not correspond to the position of the actual device (the device may not be visible to the first person) with which the bi-directional information exchange link is established.

In many embodiments, the first detector 109 is arranged to determine the bi-directional information exchange link in response to a direction between the first person and a device or person. In particular, the first detector 109 may be arranged to detect whether the direction between the first person and another device matches an orientation for the first person.

For example, the criterion may determine the direction from the first person to all devices in the room. It may then proceed to determine the face orientation/direction and/or the eye gaze orientation/direction. It may then evaluate the direction to the different devices to see if any of the directions align with the orientation of the first person. If an alignment requirement is met, and specifically if the angular difference between the direction to one of the devices and the orientation direction for the first person is below a given threshold, it may be considered that a bi-directional information exchange link between the first person and the device is detected. Such a requirement may essentially correspond to a detection that the first person is facing the device, and specifically may correspond to a detection that the first person is focusing on the device, and e.g. is looking or talking to the device. Accordingly, a bi-directional information exchange link may be considered to have been detected between the first person and the device that is in the direction of the face/eye gaze. The orientation of the first person may typically be a view direction. The view direction may be an indication/estimate of the direction in which the person is seeing.

Specifically, if the orientation of the first person matches the direction between the first person and a first device/person, e.g. such that the angle between these is less than a threshold value (of say 5°, 10°, 15°) then it is considered to be detected that a bi-directional information exchange link has been formed between the first person and the first device/person. Further requirements may be included, such as that audio or gesture is detected from the first person (and/or from a second person), and/or that a second device is detected to radiate audio or present an image.

In some embodiments, it may alternatively be detected that the other entity is oriented towards the first person, i.e. that the device or person engaging with the first person is aligned with the direction between the first person and the other device or person. The orientation for the second person may specifically be a facing orientation, or head facing orientation, and/or a gaze orientation. The orientation for a second device may specifically be an (information) projection or radiation orientation. For example, for a display, the orientation may be a direction perpendicular to the display plane and for a speaker the orientation may be a main sound radiation direction.

Specifically, if the orientation of the second device or person matches the direction between the second device/person and the first person, e.g. such that the angle between these is less than a threshold value (of say 5°, 10°, 15°), then it is considered to be detected that a bi-directional information exchange link has been formed between the first person and the second device/person. Further requirements may be included, such as that audio or gesture is detected from the first person (and/or from a second person), and/or that a second device is detected to radiate audio or present an image.

In many embodiments, it may be required that both the orientation of the first person and the orientation of the second person/device is aligned with the direction between the first person and the second person/device.

In some embodiments, the first detector 109 may be arranged to detect the bi-directional information exchange link in response to a detection that a pose for the first person and a pose for a second person or device meet a match criterion and optionally that a sound from at least one of the first person and the other entity of the bi-directional information exchange link meet a criterion (and often both).

In some embodiments, the match criterion may be such that the angle between the vectors representing an orientation of the two entities is less than a given amount (say 5°, 10°, 15°) but with the directions being opposite. For example, the match criterion may correspond to a requirement that a normalized dot product between vectors representing the orientations is negative and has a magnitude of no less than a given threshold (e.g. of 0.8, 0.9, 0.95).

The sound criterion may be that the first person radiates sound of a volume not less than a given threshold (e.g. average over a given time) and/or that the second person/device radiates sound of a volume not less than a given threshold (e.g. average over a given time).

Such an approach and detection may in many scenarios provide a reliable indication that two people, or indeed a person and a device, are actively engaging with each other. It may provide a reliable indication of two entities facing and focusing on each other while exchanging information.

When considering alignment between two directions, or between a direction and an orientation, the apparatus may in some embodiments only consider how parallel the directions/orientations are whereas in other embodiments it may also be taken into whether the evaluated directions/orientations are facing in the same direction. In some embodiments, alignment may be determined based on the smallest angle formed between the directions/orientations whereas in other embodiments alignment may also consider whether these are pointing in the same direction. In some embodiments, a parameter that is monotonically dependent on the magnitude of the dot product between two directions, or between a direction and an orientation, will be considered whereas in other embodiments a parameter that is monotonically dependent on the (signed) dot product between two directions, or between a direction and an orientation, will alternatively or additionally be considered.

As described, the apparatus uses different modalities to determine various properties and to detect the bi-directional information exchange links. As previously, described, the (at least) two sensor modalities may be a vision modality and an audition modality. Specifically, one or more cameras may be used to detect positions and orientations of people and/or devices in the environment.

For example, a direction of focus for a person can be detected from 2D images using human pose estimation. For example, a 3D head position could be determined via known size of atypical human head. The head orientation part relative to the optical axis of the camera could be determined via the relative image positions of facial features and the relation of those with atypical 3D head model. Finally, the 'virtual head' could be placed at a more or less correct location and orientation in 3D space using the known (e.g. a-priori calibrated) pose of the capture camera relative to the world coordinate system. As an alternative, a depth sensor, such as present in the Azure Kinect, could be used to achieve the same thing. For instance, the Azure Kinect Body Tracking SDK outputs the positions of human skeleton joints in 3D space. Knowing the pose of the Azure Kinect depth sensor relative to the world space allows to directly represent the points in world space. A human gaze vector could be constructed orthogonal to the position of the two ears and pointing outwards from halfway the line connecting the two ears outwards in the direction of the nose. Similarly, based on camera detection, gestures performed by a person may be recognized.

Microphones, and specifically e.g. microphone arrays or directional microphones, may be used to monitor sound in the environment and may specifically be used to identify who is talking (e.g. by voice pattern distinguishing between different voices or by detecting the direction from which the audio is received and coordinating with vision based position detection).

For example, for an audio/microphone capture modality, beamforming may be used to isolate one or multiple persons talking and to optionally determine the 2D or 3D direction from the microphone and thus the position. It may be used to detect the people talking thereby allowing annotation of persons (e.g. with a name or title). Such an approach may for example be based on an initial registration procedure. Audio modalities and sensors may be used to track sound in specific regions which may e.g. enable use of exclusion or priority zones.

Figure 3:
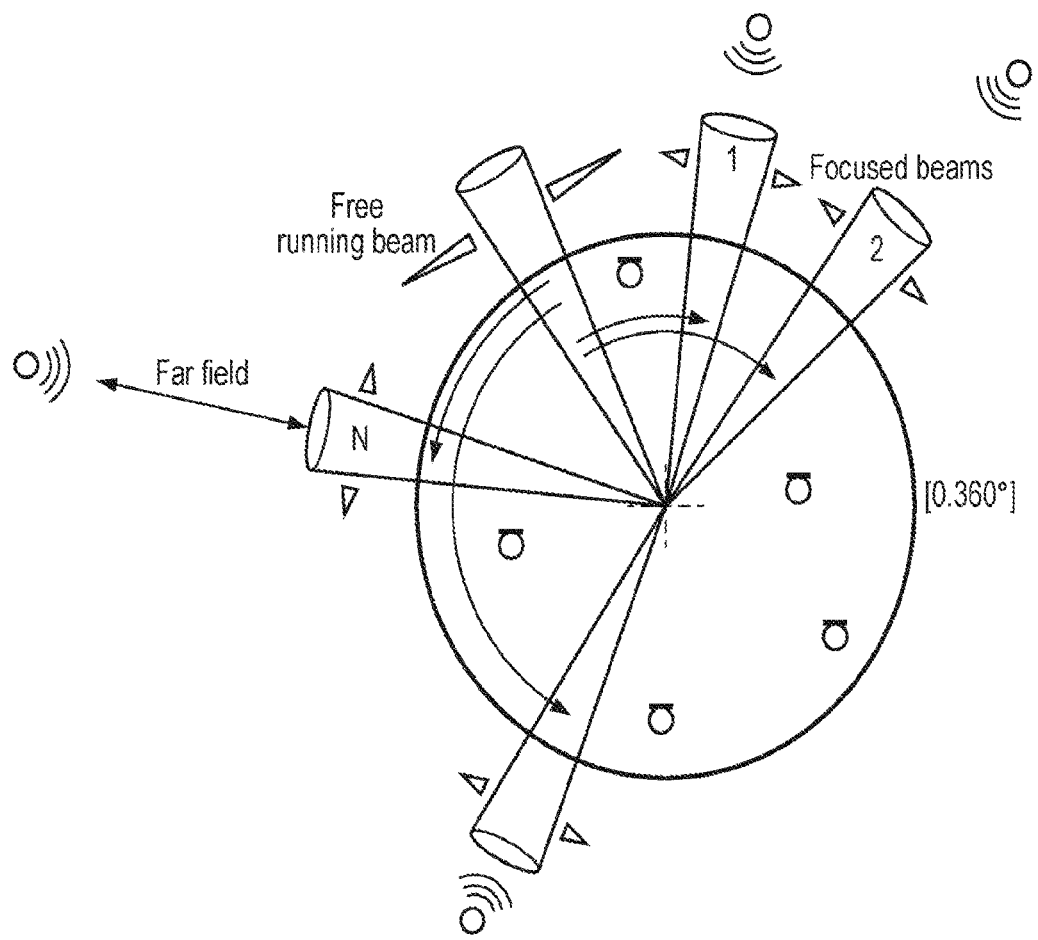
FIG. 3 illustrates an example of a user of a beam forming audio sensor to detect audio sources in an environment.

For example, by strategically locating a collection of microphone sensors, time/phase differences can be used to determine the direction of a coherent source. Using adaptive delay and sum beam forming (DSB) or filter and sum beamforming (FSB), a beam of increased sensitivity is directed towards a possibly moving speaker. FIG. 3 shows an example of a multi-beam FSB solution that is able to concurrently direct focused tracking beams to multiple sources and at the same time by using a fast-tracking beam, scan the area for new sources. Based on the filter coefficients of the FSB filters, the angle of each beam relative to the microphone geometry can be determined.

An example of another modality may be depth from a given sensor position. For example, depth sensors may be used to detect 3D skeleton points for multiple persons in real-time. When using one or more such systems, the head-pose of a person can be inferred in real-time. Such detection and estimation may then be used to estimate the communication intentions of various people and to detect bi-directional information exchange links. For example, estimated head poses may be derived from the skeleton data and evaluated with respect to known/estimated positions of different devices (e.g. displays).

Other examples of modalities include: Ultrasound, Infrared, Radar, Tag detection.

The exact approaches used by, and properties determined by, the different sensors using the different modalities may depend on the preferences and requirements of the individual embodiment. Similarly, the approach for detecting the bi-directional information exchange link and e.g. determining directions or positions may depend on the preferences and requirements of the individual embodiment.

For example, the properties from the sensors may include, and/or the approach for detecting bi-directional information exchange links may consider, one or more of the following: a power status of a device; a position of an entity; an orientation of an entity; a head orientation for a person; an eye pose for a person; a glance direction for a person; a gesture of a person; a direction of movement of an entity; a user action; a sound emitted from an entity; and speech from a person.

In many embodiments, the bi-directional information exchange link may comprise an audiovisual communication link from the first person to the device/other person forming the bi-directional information exchange link. The audiovisual link may be a link where audio and/or visual information is exchanged in the two directions. The audiovisual link is formed in the real-world environment. It may directly be formed by sound and/or light propagating in the real-world environment.

A typical example may be a person speaking commands to a display that responds by adapting the displayed information to be viewed by the first person. Another example may be where the first person may use gesture input to control e.g. a medical equipment that may respond by a sound or speech utterance that can be heard by the first person. In many embodiments, the bi-directional information exchange link may be a communication link that carries both audio and video in at least one direction. For example, a display may also generate sound, or a medical equipment may detect both gestures and spoken commands from the first person.

Thus, in many embodiments, the bi-directional information exchange link may comprise an audiovisual communication link from first person to the device/other person and/or from the device/other person to the first person. For example, when the bi-directional information exchange link reflects two people talking directly to each other, both audio and visual information is typically exchanged in both directions.

In some embodiments, at least one of the sensors may comprise a plurality of sensor elements at different positions in the environment. The sensor elements may be remote from each other and may e.g. be arranged with a minimum distance of at least 1 meter, 2 meters, 5 meters, or in some applications 10 meters.

For example, microphones (or microphone arrays) may be positioned at different points in a room and the audio signals captured from the different microphones may be used to detect bi-directional information exchange links. For example, the position of a user may be determined based on the audio captured at the different positions, such as e.g. simply by detecting which microphone detects the largest audio, or e.g. by triangulating beams of adaptive beamforming microphones.

As another example, cameras may be positioned at different positions around the room such that better visibility of all areas are achieved and such that the risk of e.g. people or devices blocking other people or devices is reduced. For example, a person may be tracked by multiple cameras with the orientation of the persons head being determined based on the camera in which the head is most clear.

In some embodiments, the apparatus may comprise a user output for generating a user indication in response to the detection of the bi-directional information exchange link. For example, when a new bi-directional information exchange link is detected, the apparatus may generate an alert. The alert may simply be an indication that a bi-directional information exchange link has been detected, or may provide an indication of some properties of the bi-directional information exchange link such as specifically which other person or entity is part of forming the bi-directional information exchange link. The alert could for example speak out the name or type of the device that has been detected, e.g. in an operating theatre, the apparatus may indicate that a specific medical instrument has been transmitted a command to receive audio inputs, such as e.g. the apparatus uttering the sentence "ECG Monitor Ready for Command". In other examples, the apparatus may simply generate an audio or light alert.

The apparatus may accordingly comprise a feedback mechanism that may provide information back to the users in the room. For example, an audible acknowledgement may be provided or e.g. a visual indication may be presented on a screen, e.g. by means of a logo or LED (e.g. red, orange, green). A visual indication may often be preferable in Health Care (HC) settings which tend to be sound intensive environments.

After acknowledgement of feedback, it may in many embodiments not be required that the person maintains focus to that specific device but rather it may be considered that once the bi-directional information exchange link has been detected, the device has e.g. been validated for receiving voice inputs. This status may for example be maintained until a new bi-directional information exchange link is detected for the same person.

In some embodiments, the initiator 111 may be arranged to determine an identity indication for the first person included in the bi-directional information exchange link. For example, based on the camera, face detection may be applied to identify the person for which the bi-directional information exchange link is detected. Alternatively or additionally, the initiator 11 may, based on captured audio, detect a speaker identity from the audio captured by one or more microphones. The initiator 111 may for example be arranged to compare signatures determined from the video or audio to stored signatures linked to specific identities. If a match between signatures is sufficiently accurate, the first person may be considered to be identified as the person linked with the stored signature.

The initiator 111 may further be arranged to initiate the action in dependence on the determined identity indication. In some embodiments, the action may only be initiated if the identity indication indicates a person that has previously been selected as a person for which the action may be issued. Thus, in some embodiments, the action is only initiated if the identified user is an eligible user for the action. E.g. it may be that a specific medical apparatus is only to be operated by a specific medical expert/consultant. In this case, an action may be transmitted to the medical equipment when it is detected that a first person has formed a bi-directional information exchange link with the equipment, but only if the first person is that specific medical expert/consultant (who has been previously authorized).

In some embodiments, the action being initiated may be adapted depending on the identity indication. As a specific example, the action may be modified depending on the person, such as for example the volume of a display may be adapted to the preferences of the specific person that is identified. As another example, an action initiation command may be transmitted to another entity, such as specifically to the device with which the bi-directional information exchange link is formed. The action initiation command may for example be adapted to include data indicating the identity that has been detected thereby allowing the device to adapt the operation to the specific user.

All of the issues and terms may be superseded by the term real-world, including terms such as direction, orientation, entity, environment, bi-directional information exchange link that may be replaced by the terms real-world direction, real-world orientation, real-world entity, real-world environment, real-world bi-directional information exchange link.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

Generally, examples of an apparatus and method are indicated by below embodiments.

EMBODIMENTS

1. An apparatus comprising:
 a first sensor (101) arranged to determine a first set of properties for a plurality of entities in an environment, the first set of properties being determined in accordance with a first sensor modality, each entity of the plurality of entities being a person or a device;
 a second sensor (103) arranged to determine a second set of properties for the plurality of entities, the second set of properties being determined in accordance with a second sensor modality, the second sensor modality being different from the first sensor modality;
  a first processor (105) arranged to determine directions between entities of the plurality of entities;
  a second processor (107) arranged to determine at least one orientation of an entity of the plurality of entities in response to the first set of properties;
 a first detector (109) arranged to detect a bi-directional information exchange link between a first person of the plurality of entities and another entity of the plurality of entities out of a plurality of possible bi-directional information exchange links between entities of the plurality of entities in response to the directions and the at least one orientation;
 an initiator (111) arranged to initiate an action in response to the detection of the bi-directional information exchange link, and wherein first detector (109) is arranged to detect the bi-directional information exchange link in response to the first set of properties and the second set of properties.

2. The apparatus of claim 1 wherein the at least one orientation comprises an orientation of the first person.

3. The apparatus of any previous claim wherein the first detector (109) is arranged to determine the bi-directional information exchange link in response to a direction between the first person and the another entity.

4. The apparatus of any previous claim wherein the first detector (109) is arranged to determine the bi-directional information exchange link in response to a detection that an orientation of the first person aligns with a direction between the first person and the another entity.

5. The apparatus of claim 1 or 2 wherein the at least one orientation comprises an orientation of the another entity.

6. The apparatus of any previous claim wherein the first detector (109) is arranged to determine the bi-directional information exchange link in response to a criterion that includes a requirement that a projection orientation from the another entity to the first person is aligned with a direction between the first person and the another entity.

7. The apparatus of any previous claim wherein the first detector (109) is arranged to determine the bi-directional information exchange link in response to a criterion that includes a requirement that a view direction of the first person is aligned with a direction between the first person and the another entity.

8. The apparatus of any previous claim further comprising a second detector (113) for detecting a trigger action by the first person; and wherein the initiator (111) is arranged to initiate the action in response to the trigger action.

9. The apparatus of claim 8 wherein the second detector (113) is arranged to detect the trigger action as a communication by the first person over the bi-directional information exchange link.

10. The apparatus of any previous claim wherein the first sensor modality is a vision modality and the second sensor modality is an audition modality.

11. The apparatus of any previous claim wherein the another entity is a person.

12. The apparatus of any previous claim wherein the first detector (109) is arranged to detect the bi-directional information exchange link in response to a detection that a pose for the first person and a pose for the another entity meet a match criterion; and a sound from at least one of the first person and the another entity meet a criterion.

13. The apparatus of any previous claim wherein the action is an action of the another entity.

14. The apparatus of claim 1 wherein the first sensor modality and the second sensor modality are different modalities selected from the group of:
 Vision,
 Audition,
 Tactition,
 Ultrasound,
 Infrared,
 Radar,
 Tag detection.

15. A method of initiating an action, the method comprising:
 determining a first set of properties for a plurality of entities in an environment, the first set of properties being determined in accordance with a first sensor modality, each entity of the plurality of entities being a person or a device;
 determining a second set of properties for the plurality of entities, the second set of properties being determined in accordance with a second sensor modality, the second sensor modality being different from the first sensor modality;
 determining directions between entities of the plurality of entities;
 determining at least one orientation of an entity of the plurality of entities in response to the first set of properties;
 detecting a bi-directional information exchange link between a first person of the plurality of entities and another entity of the plurality of entities out of a plurality of possible bi-directional information exchange links between entities of the plurality of entities in response to the directions and the at least one orientation;
 initiating an action in response to the detection of the bi-directional information exchange link, wherein the detection of the bi-directional information exchange link is in response to the first set of properties and the second set of properties.

The invention claimed is:

1. An apparatus comprising:
a first sensor, wherein the first sensor is arranged to determine a first plurality of properties for a plurality of entities,
wherein the first plurality of properties is determined in accordance with a first sensor modality;
a second sensor,
wherein the second sensor is arranged to determine a second plurality of properties for the plurality of entities,
wherein the second plurality of properties is determined in accordance with a second sensor modality,
wherein the second sensor modality is different from the first sensor modality;
a first processor circuit, wherein the first processor circuit is arranged to determine real world directions between at least two entities of the plurality of entities;
a second processor circuit, wherein the second processor circuit is arranged to determine at least one orientation of at least one entity of the plurality of entities in response to the first plurality of properties;
a first detector circuit, wherein the first detector circuit is arranged to detect a bi-directional information exchange link in response to the directions and the at least one orientation,
wherein the bi-directional information exchange link exists between a first entity of the plurality of entities and a second entity of the plurality of entities,
wherein the bi-directional information exchange link is a real world audiovisual communication link,
wherein the real world audiovisual communication link enables information to be exchanged from the first entity to the second entity,
wherein the real world audiovisual communication link enables information to be exchanged from the second entity to the first entity;
an initiator circuit,
wherein the initiator circuit is arranged to initiate an action in response to the detection of the bi-directional information exchange link,
wherein the first detector circuit is arranged to detect the bi-directional information exchange link in response to the first plurality of properties and the second plurality of properties.

2. The apparatus of claim 1, wherein the at least one orientation comprises an orientation of the first entity.

3. The apparatus of claim 1,
wherein the directions comprises a first direction,
wherein the first direction is between the first entity and the second entity,
wherein the first detector circuit is arranged to determine the bi-directional information exchange link in response to the first direction.

4. The apparatus of claim 1,
wherein the directions comprises a first direction,
wherein the first direction is between the first entity and the second entity,
wherein the first detector circuit is arranged to determine the bi-directional information exchange link in response to a detection that an a orientation of the first entity aligns with the first direction.

5. The apparatus of claim 1, wherein the at least one orientation comprises an orientation of the second entity.

6. The apparatus of claim 1,
wherein the directions comprises a first direction,
wherein the first direction is between the first entity and the second entity,
wherein the first detector circuit is arranged to determine the bi-directional information exchange link in response to a criterion,
wherein the criterion comprises a requirement that an orientation of radiation of information from the second entity to the first entity is aligned with the first direction.

7. The apparatus of claim 1,
wherein the directions comprises a first direction,
wherein the first direction is between the first entity and the second entity,
wherein the first detector circuit is arranged to determine the bi-directional information exchange link in response to a criterion,
wherein the criterion comprises a requirement that a view direction of the first entity is aligned with the first direction.

8. The apparatus of claim 1, further comprising a second detector circuit,
wherein the second detector circuit is arranged to detect a trigger action by the first entity,
wherein the initiator circuit is arranged to initiate the action in response to the trigger action.

9. The apparatus of claim 8, wherein the second detector circuit is arranged to detect the trigger action as a communication by the first entity over the bi-directional information exchange link.

10. The apparatus of claim 1,
wherein the first sensor modality is a vision modality,
wherein the second sensor modality is an audition modality.

11. The apparatus of claim 1,
wherein the first entity is a person,
wherein the second entity is a person.

12. The apparatus of claim 1,
wherein the first detector circuit is arranged to detect the bi-directional information exchange link in response a first detection and a second detection,
wherein the first detection comprises detecting that a pose for the first entity and a pose for the second entity meet a match criterion,
wherein the second detection comprises detecting that a sound from at least one of the first entity and the second entity meet a sound criterion.

13. The apparatus of claim 1, wherein the action is an action of the second entity.

14. The apparatus of claim 1,
wherein the first sensor modality and the second sensor modality are different modalities,
wherein the first sensor modality and the second sensor modality selected from the group consisting of Vision, Audition, Tactition, Ultrasound, Infrared, Radar, and Tag detection.

15. The apparatus of claim 1,
wherein the at least two entities comprise a first entity and a second entity,
wherein at least one of the directions is a direction between the at least one entity to the second entity.

16. A method comprising:
determining a first plurality of properties of a plurality of entities,
wherein the first plurality of properties is determined in accordance with a first sensor modality;
determining a second plurality of properties of the plurality of entities, the second plurality of properties is determined in accordance with a second sensor modality,
wherein the second sensor modality is different from the first sensor modality;
determining directions between at least two entities of the plurality of entities;
determining at least one orientation of at least one entity of the plurality of entities in response to the first plurality of properties;
detecting a bi-directional information exchange link in response to the directions and the at least one orientation,
wherein the bi-directional information exchange link exists between a first entity of the plurality of entities and a second entity of the plurality of entities
wherein the bi-directional information exchange link is a real world audiovisual communication link,
wherein the real world audiovisual communication link enables information to be exchanged from the first entity to the second entity, wherein the real world audiovisual communication link enables information to be exchanged from the second entity to the first entity;
initiating an action in response to the detection of the bi-directional information exchange link, wherein the detection of the bi-directional information exchange link is in response to the first plurality of properties and the second plurality of properties.

17. A computer program stored on a non-transitory medium, wherein the computer program when executed on a processor performs the method as claimed in claim 16.

18. The method of claim 16,
wherein the at least two entities comprise a first entity and a second entity,
wherein at least one of the directions is a direction between the at least one entity to the second entity.

19. The method of claim 16, wherein the at least one orientation comprises an orientation of the first entity.

20. The method of claim 16,
wherein the directions comprises a first direction,
wherein the first direction is between the first entity and the second entity,
wherein the first detector circuit is arranged to determine the bi-directional information exchange link in response to the first direction.

21. The method of claim 1,
wherein the directions comprises a first direction,
wherein the first direction is between the first entity and the second entity,
wherein the first detector circuit is arranged to determine the bi-directional information exchange link in response to a detection that an orientation of the first entity aligns with the first direction.

22. The method of claim 16, wherein the at least one orientation comprises an orientation of the second entity.

23. The method of claim 16,
wherein the directions comprises a first direction,
wherein the first direction is between the first entity and the second entity,
wherein the first detector circuit is arranged to determine the bi-directional information exchange link in response to a criterion,
wherein the criterion comprises a requirement that an orientation of radiation of information from the second entity to the first entity is aligned with the first direction.

24. The method of claim 16,
wherein the directions comprises a first direction,
wherein the first direction is between the first entity and the second entity,
wherein the first detector circuit is arranged to determine the bi-directional information exchange link in response to a criterion,
wherein the criterion comprises a requirement that a view direction of the first entity is aligned with the first direction.

25. The method of claim 16, further comprising a second detector circuit,
wherein the second detector circuit is arranged to detect trigger action by the first entity,
wherein the initiator circuit is arranged to initiate the action in response to the trigger action.

26. The method of claim 25, wherein the second detector circuit is arranged to detect the trigger action as a communication by the first entity over the bi-directional information exchange link.

27. The method of claim 16,
wherein the first sensor modality is a vision modality,
wherein the second sensor modality is an audition modality.

28. The method of claim 16,
wherein the first detector circuit is arranged to detect the bi-directional information exchange link in response a first detection and a second detection,
wherein the first detection comprises detecting that a pose for the first entity and a pose for the second entity meet a match criterion,
wherein the second detection comprises detecting that a sound from at least one of the first entity and the second entity meet a sound criterion.

29. The method of claim 16, wherein the action is an action of the second entity.

* * * * *